US008189757B2

(12) United States Patent
Elias et al.

(10) Patent No.: US 8,189,757 B2
(45) Date of Patent: May 29, 2012

(54) CALL OUT AND HUNT FUNCTIONS FOR TELECONFERENCING SERVICES

(75) Inventors: Mark A. Elias, Eastpointe, MI (US); Neil Jacobson, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 793 days.

(21) Appl. No.: 12/271,505

(22) Filed: Nov. 14, 2008

(65) Prior Publication Data

US 2010/0124320 A1    May 20, 2010

(51) Int. Cl.
*H04M 3/42* (2006.01)

(52) U.S. Cl. ......... 379/202.01; 379/204.01; 379/205.01; 455/416

(58) Field of Classification Search ............. 379/202.01, 379/205.01, 204.01, 203.01, 201.01; 455/416
See application file for complete search history.

(56) References Cited

U.S. PATENT DOCUMENTS

| 7,412,047 B2 | 8/2008 | Nguyen et al. | |
|---|---|---|---|
| 7,653,193 B2* | 1/2010 | Pfleging et al. | 379/205.01 |
| 2007/0172046 A1* | 7/2007 | Pfleging et al. | 379/202.01 |

* cited by examiner

*Primary Examiner* — Thjuan K Addy
(74) *Attorney, Agent, or Firm* — Greenblum & Bernstein, P.L.C.

(57) ABSTRACT

A teleconference system for coordinating a prearranged teleconference includes a memory that stores established parameters for contacting teleconference participants. The teleconference system also includes a caller that systematically hunts and automatically calls out to designated teleconference participants over a communications network based upon the established parameters, without the need for the designated participants to call in to the teleconference.

19 Claims, 3 Drawing Sheets

CALL OUT AND HUNT FUNCTIONS FOR TELECONFERENCING SERVICES

BACKGROUND

1. Field of the Disclosure

The present disclosure relates to the field of communications. More particularly, the present disclosure relates to coordinating prearranged teleconferences for which a teleconference system automatically calls out to designated teleconference participants without the need for the teleconference participants to call into the teleconference.

2. Background Information

Traditionally, prearranged teleconferences are arranged manually by either a meeting coordinator telephoning out to designated participants to join the teleconference at a preset time, or by designated participants telephoning in to the meeting coordinator to join the teleconference at the preset time. In the case where designated participants are expected to telephone in, the meeting coordinator may then still manually telephone out to participants to have them join the teleconference when the designated participants fail to telephone in at the preset time.

BRIEF DESCRIPTION OF THE DRAWINGS

The present disclosure is further described in the detailed description that follows, by reference to the noted drawings by way of non-limiting examples of embodiments of the present disclosure, in which like reference numeral represent similar parts throughout several views of the drawings, and in which.

DETAILED DESCRIPTION

Figure 1:
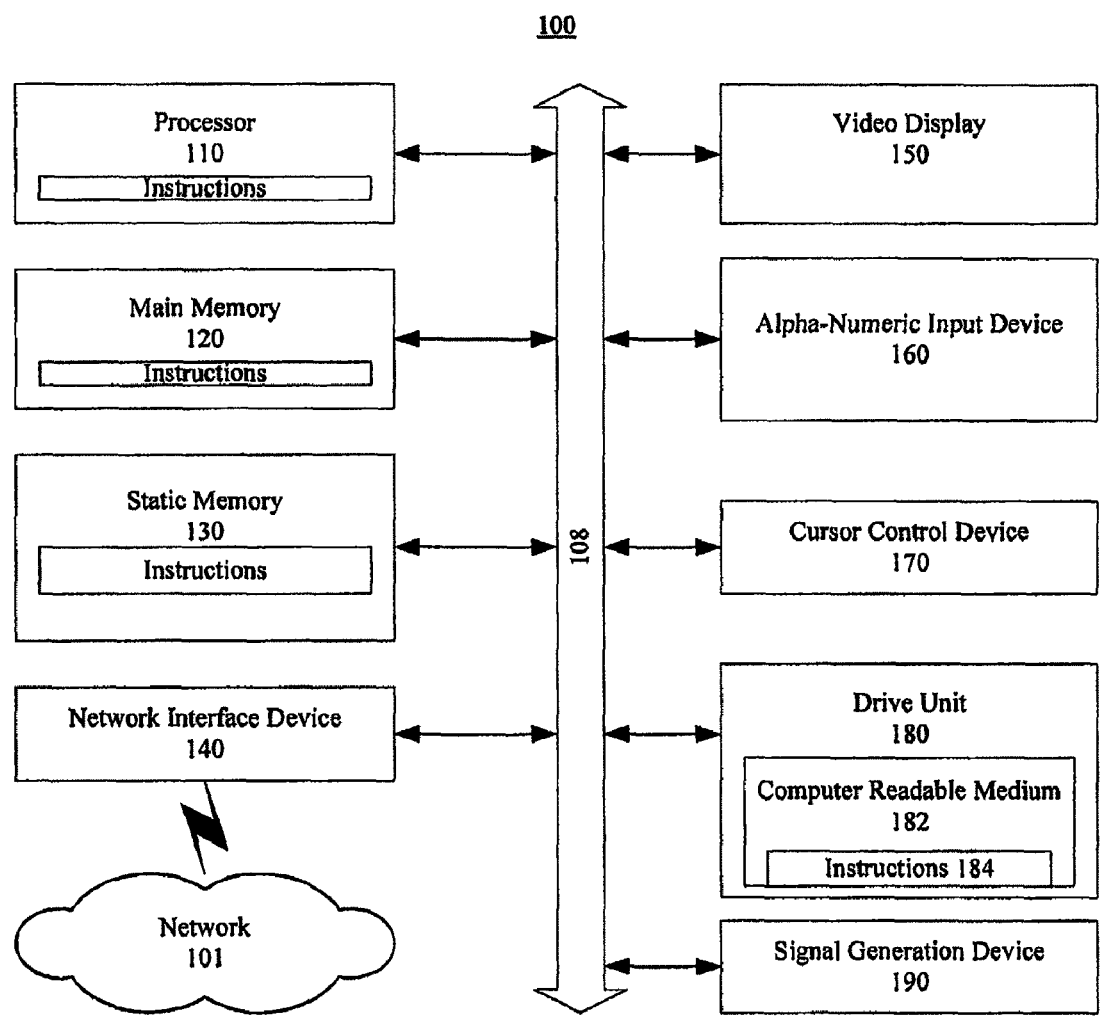
FIG. 1 illustrates an embodiment of a general computer system.

In view of the foregoing, the present disclosure, through one or more of its various aspects, embodiments and/or specific features or sub-components, is thus intended to bring out one or more of the advantages as specifically noted below.

According to an embodiment of the present disclosure, a teleconference system coordinates a prearranged teleconference involving a plurality of teleconference participants over at least one communications network. The teleconference system includes a memory that stores established parameters for contacting each of the plurality of teleconference participants. The teleconference system also includes a caller that systematically hunts and automatically calls out to designated teleconference participants that have been designated to participate in the teleconference over the at least one communications network based on the established parameters.

In another embodiment, the caller automatically calls out to the designated teleconference participants at a preset time, and the caller automatically includes all designated teleconference participants who answer the automatic call in the teleconference.

In an embodiment, the established parameters include a profile for each of the plurality of teleconference participants, and the profile includes each teleconference participant's name associated with one or more phone numbers where they may be contacted.

In another embodiment, the teleconference system includes a user application by which each of the plurality of teleconference participants may edit or update their profile.

In another embodiment, the profile further includes at least one or more additional unique identifiers, the unique identifiers comprising at least one of an employee number, an alphanumeric descriptor, and other identifiers.

In an embodiment, the established parameters include a phone number prioritization listing indicating the priority order of phone numbers associated with each of the plurality of teleconference participants such that the caller follows the phone number prioritization listing and automatically calls each designated teleconference participant using a highest priority phone number first. When the designated teleconference participant does not answer the first automatic call, the caller calls the next highest priority phone number. The caller continues to follow this prioritization listing until the designated teleconference participant answers, or all of the phone numbers associated with the designated teleconference participant have been called.

In another embodiment, the established parameters include a do not use flag associated with each of the plurality of teleconference participant's phone numbers in the prioritization listing that can be set to designate which of the teleconference participant's phone numbers is to be omitted from the prioritization listing.

In an embodiment, the do not use flag can be set for specific days when a teleconference participant's phone number would be temporarily omitted from the prioritization listing.

In another embodiment, the do not use flag includes attribute settings that can be set for each of the teleconference participant's phone numbers, the attribute settings including specified times for each day when a phone number would be temporarily omitted from the prioritization listing.

In an embodiment, the attribute settings for each of the teleconference participant's phone numbers include specifying the times for each day when each phone number would be included in the prioritization listing, which when set for a particular day the remaining times for that particular day would be temporarily omitted from the prioritization listing.

In another embodiment, the attribute settings for each of the teleconference participant's phone numbers include settings that may be customized according to considerations associated with each teleconference participant.

In an embodiment, the plurality of teleconference participants are each provided with a designated personal access code; and each automatically called teleconferencing participant is connected to the teleconference upon entering the designated personal access code.

In another embodiment, if the teleconference participant has been designated to participant in more than one teleconference at a particular time, the caller only makes one automatic call.

In an embodiment, when the teleconference participant selects the particular teleconference in which the teleconference participant will participate, the remaining teleconferences in which the teleconference participant was designated to participate that conflict with the selected particular teleconference are automatically non-selected and the caller stops making any further automatic calls to the teleconference participant for the non-selected remaining teleconferences.

In another embodiment, after the teleconference participant has entered a designated personal access code, the teleconference participant is provided with a listing of teleconferences if the teleconference participant has been designated to participate in more than one teleconference, and the teleconference participant then selects the particular teleconference in which the teleconference participant wanted to participate.

In an embodiment, the caller does not call out to a designated teleconference participant who has already called in and joined the teleconference.

In another embodiment of the invention, a method coordinates a prearranged teleconference involving a plurality of teleconference participants over at least one communications network. The method comprises storing established parameters for contacting each of the plurality of teleconference participants in a memory; and systematically hunting and automatically calling out to designated teleconference participants that have been designated to participate in a teleconference over the at least one communications network based on the established parameters.

In a further embodiment of the invention, a computer readable medium stores a computer program that coordinates a prearranged teleconference involving a plurality of teleconference participants over at least one communications network. The medium includes a storing code segment, recorded on the medium, that stores established parameters for contacting each of the plurality of teleconference participants in a memory; and an automatic caller segment that systematically hunts and automatically calls out to designated teleconference participants that have been designated to participate in a teleconference over the at least one communications network based on the established parameters.

In an embodiment, the method coordinates a prearranged teleconference in which the stored established parameters include a profile for each of the plurality of teleconference participants, the profile including each teleconference participant's name associated with one or more phone numbers where they may be contacted.

In another embodiment, the method coordinates a prearranged teleconference in which the established parameters include a phone number prioritization listing indicating the priority order of phone numbers associated with each of the plurality of teleconference participants such that the caller follows the phone number prioritization listing and automatically calls each designated teleconference participant using a highest priority phone number first. The method also provides that when the designated teleconference participant does not answer the first automatic call, the caller calls the next highest priority phone number. The method further provides that the caller continues to follow the prioritization listing until the designated teleconference participant answers, or all of the phone numbers associated with the designated teleconference participant have been called.

The various aspects and embodiments of the present disclosure are described in detail below.

FIG. 1 is an illustrative embodiment of a general computer system, on which a method to provide transparent voice registration and verification can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
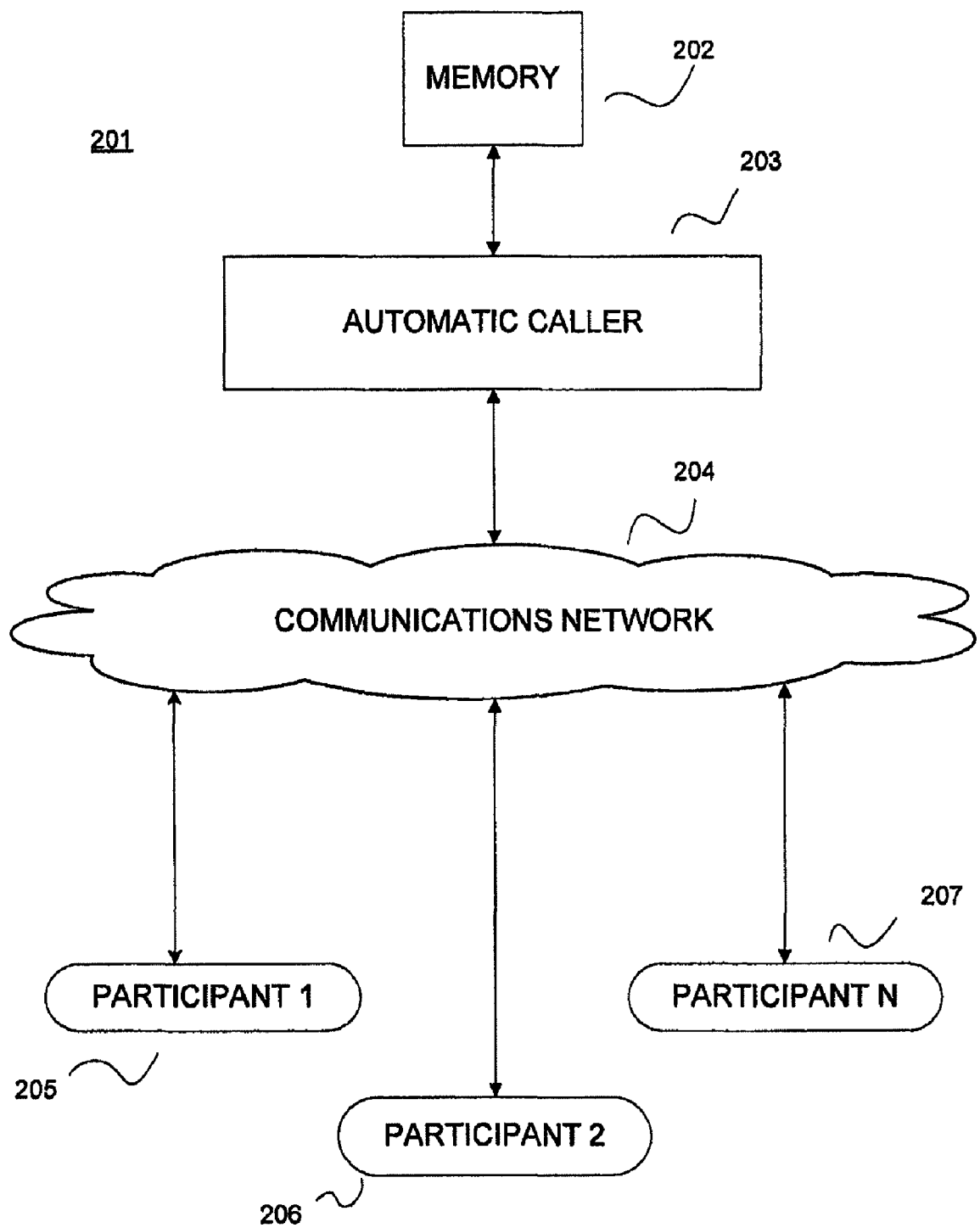
FIG. 2 is a block diagram depicting an exemplary network architecture, according to an aspect of the present disclosure.

FIG. 2 is a block diagram depicting an exemplary network architecture 201, according to an aspect of the present disclosure, for coordinating a prearranged teleconference involving a plurality of teleconference participants 205-207. Participant 207 is identified as Participant "n" to indicate that the number of participants for any teleconference may vary greatly.

In FIG. 2, the network architecture 201 includes a memory 202 that stores established parameters for contacting each of a the plurality of teleconference participants 205-207. The Automatic Caller 203 operates together with the memory 202 in setting up the teleconference. In setting up a teleconference, the Automatic Caller 203 automatically calls out to designated teleconference participants that have been designated to participate in the teleconference over at least one communications network 204. It should be noted that any number of communication networks may be used in setting up the teleconference, including networks utilizing various analog, digital, internet, satellite, wireless, etc., forms of communication.

The Automatic Caller 203 makes the calls to the designated teleconference participants at a preset time based on the established parameters stored in the memory 202, without the need for the designated teleconference participants to call in to the teleconference. The established parameters include a profile for each of the plurality of teleconference participants. In the embodiment of FIG. 2, each teleconference participant's profile includes at least the teleconference participant's name associated with one or more phone numbers where they may be contacted. The profile for each teleconference participant may also include one or more additional unique identifiers, such as an employee number, an alphanumeric descriptor, or any other unique identifier that would be desired or useful.

Additionally, each participant's profile may include a phone number prioritization listing indicating the priority order of the phone numbers associated with each of the plurality of teleconference participants. In this case, the caller follows the phone number prioritization listing and automatically calls each designated teleconference participant using the designated participant's highest priority phone number first. If the designated participant does not answer the first automatic call, then the caller calls the next highest priority phone number. The caller continues to follow this prioritization listing until all of the phone numbers associated with that designated teleconference participant have been called.

Further, each teleconference participant's profile may include do not use flags. In this embodiment, a do not use flag is associated with each of the plurality of teleconference participant's phone numbers in the prioritization listing. The do not use flags can be set to designate which, if any, of the teleconference participant's phone numbers is to be omitted from the prioritization listing.

In a further embodiment, the do not use flag may include additional preference settings. For instance, the do not use flag could be set for specific dates when the teleconference participant's phone numbers would be temporarily omitted from the prioritization listing. Also, the do not use flag may include attribute settings that can be set for each of the teleconference participant's phone numbers. In this arrangement, the attribute settings may specify times for each day when each phone number would be temporarily omitted from the prioritization listing. Additionally, the attribute settings for each of the teleconference participant's phone numbers may include specified times for each day when each phone number is included in the prioritization listing. In this arrangement, when the attribute settings are set for a particular day, the remaining times for that particular day are temporarily omitted from the prioritization listing. Furthermore, the teleconference system is so flexible that the attribute settings may be customized according to considerations associated with each teleconference participant's particular needs. In order to make the teleconference system readily adaptable and user friendly, the system includes a user application by which each of the plurality of teleconference participants may easily edit or update their personal profiles as needed.

In a typical teleconference arrangement, the automatic caller disclosed herein includes all designated teleconference participants who answer the automatic call in the teleconference. Alternatively, each of the plurality of teleconference participants may be provided with a designated personal access code. In this arrangement, an automatically called teleconference participant is only connected to the teleconference upon entering a designated personal access code. It is noted that a designated personal access code may be permanently assigned to a teleconference participant so that it may be used repeatedly for any teleconference in which they are designated to participate. In an alternative arrangement, the designated personal access code may be assigned to a teleconference participant for use by the designated participant to only participate in one designated teleconference, or in a series of teleconferences associated with a particular topic or for teleconferences held within a specified period of time.

Due to a teleconference participant's busy schedule, there may be times when a teleconference participant has been designated to participate in more than one teleconference at a particular time. In these instances, the automatic caller only makes one automatic call. When the designated participant receives the call, the participant selects the particular teleconference in which they want to participate from a listing of teleconferences in which they are designated to participate. The remaining teleconferences in which the teleconference participant is designated to participate that conflict with the selected particular teleconference are automatically non-selected. As a result, the caller does not make any further automatic calls to that teleconference participant for the non-selected remaining teleconferences.

From the above description of the automatic call out teleconference system, it should be generally understood that the automatic caller does not call out to a designated teleconference participant when the designated teleconference participant has already called in and joined a teleconference.

The hunting feature of the present disclosure may include a process for systematically determining an optimal number to call a designated teleconference participant at first based on detailed information provided in a designated participant's profile. This information includes availability and personal preference information, such as specified times, dates, or locations that a designated participant should be called or should not be called at a number. This information may include days of the week or month, or specially designated days.

The hunting feature may also include automatically making a series of subsequent calls if the designated participant does not answer the first call, with the subsequent calls also being subject to an automatic determination based upon the designated participant's profile. The hunting feature automatically continues to search for the designated participant until either the designated participant answers a call or the hunting feature has exhausted all possible avenues to contact the designated participant. Another alternative that is included in this feature is the possibility to repeat certain previously made, but unanswered calls in a predetermined manner that may include repeating all of the calls again, repeating only some of the calls a designated number of times, repeating some calls before all possible avenues are exhausted, etc.

Figure 3:
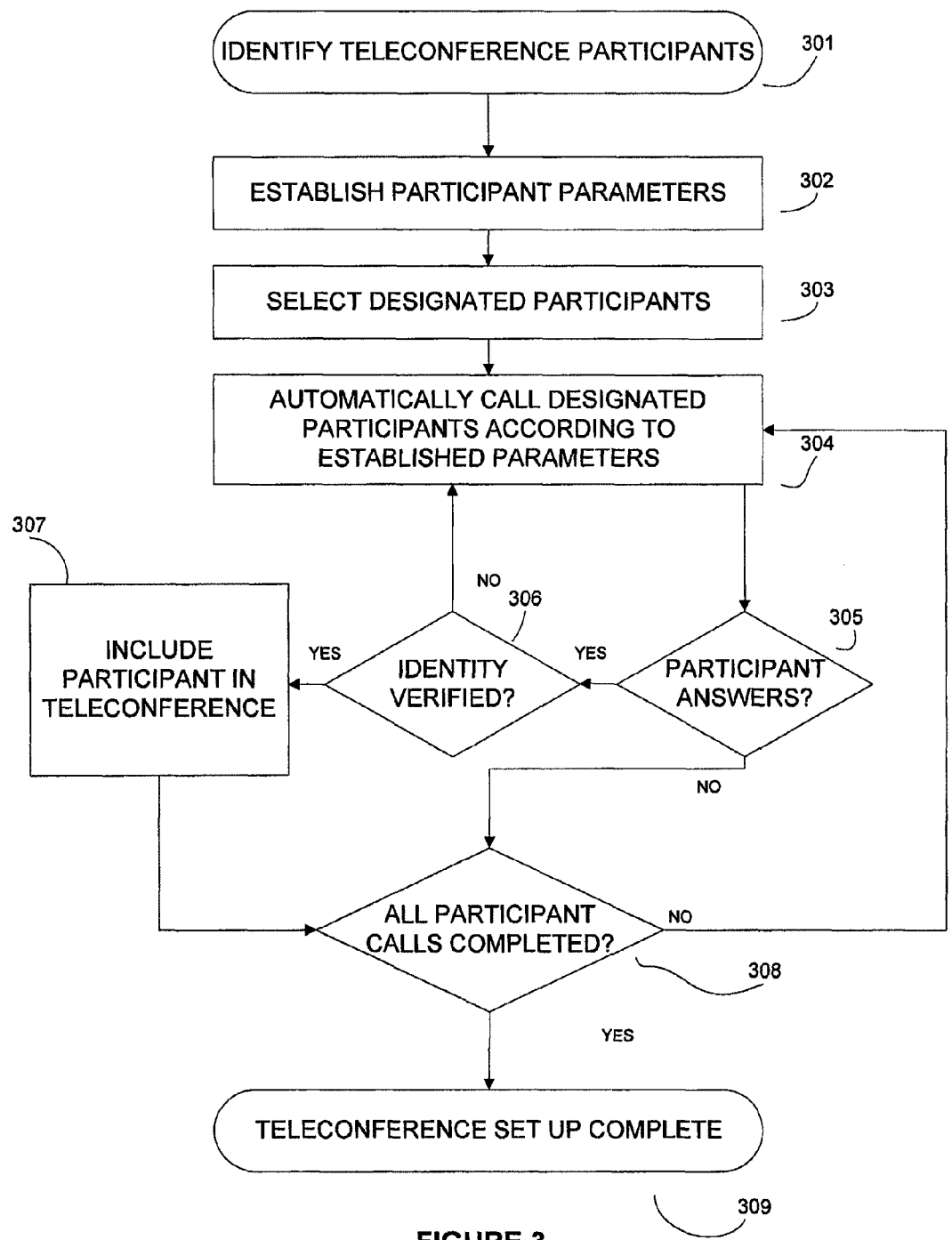
FIG. 3 is a flowchart depicting an exemplary calling out process, according to an aspect of the present disclosure.

FIG. 3 is a flowchart depicting an exemplary calling out process, according to an aspect of the present disclosure. In the flowchart, step 301 includes identifying the teleconference participants that are to be included in the teleconference system. For each of the potential teleconference participants, parameters are established at step 302. These parameters are used to establish a profile for each participant, as described above. Step 303 illustrates that for any particular teleconference, certain participants are designated to participate in the teleconference. The designated participants for any particular teleconference are usually a subset of the total potential teleconference participants. However, there may be instances in which all of the total potential teleconference participants are designated to participate in a specified teleconference.

Step 304 illustrates that the caller automatically calls out to the designated participants according to the parameters that were established for each of the participants in step 302. These parameters are used to establish a profile for each teleconference participant. When a designated participant answers the automatic call in step 305, has their identity verified in step 306 and they accept the teleconference, they are included in the teleconference per step 307. If a designated participant answers the automatic call in step 305, but their identify is not verified in step 306, then the system goes back to step 304 to check the established parameters of the designated participants to determine the next call to make. Alternatively, if the participant does not answer the automatic call, then the system determines if all of the participant calls have been completed in accordance with the established parameters of all of the designated participants in step 308. If all of the participant calls are not completed, then the system returns to step 304 to make another automatic call. If, on the other hand, all of the participant calls have been completed, then the teleconference set up is complete per step 309.

Although the present disclosure describes call out and hunt functions for teleconferencing services mainly in the context of a traditional telephony environment, the invention encompasses various alternative modes of calling arrangements including traditional wireline and wireless telephone systems, internet conferencing, video conferencing, and instant messaging conferencing. Call out and hunt functions for teleconferencing services may be used to coordinate participants using any type of addressable networked communications device that is capable of networked conferencing, including cellular phones, personal digital assistants, videoconferencing systems, and personal, laptop or desktop computers. Of course, call out and hunt functions for teleconferencing services may be used to coordinate participants using Voice over Internet Protocol. Other communication modes may include internet conferencing, multimedia conferencing, instant messaging, and the use of a video conferencing bridge. Additionally, the call out and hunt functions for teleconferencing services may be performed by various types of conferencing bridges including telephony bridges, video conferencing bridges, and internet bridges for internet conferences.

Also, various calling prioritization arrangements may be utilized, such as repeating the calling of all or a designated subset of the phone numbers included in a phone number prioritization listing for a designated teleconference participant if the designated teleconference participant does not answer any of the calls from the caller during a first pass through the phone number prioritization listing.

The teleconference system may be integrated with a computer calendaring system wherein the automated system determines designated teleconference participants from a list of teleconference participants associated with an automated calendar entry on a teleconference originator's automated calendar. The teleconference caller may also automatically initiate the calling out and hunting features at a preset time before the automated conference call calendar entry so that designated teleconference participants will be connected to the teleconference at or before the teleconference begins. Alternatively, the teleconference calling out feature may be coordinated with automatic notification and reminder E-mails or text messages to designated teleconference participants.

When a designated teleconference participant answers a call from the caller, the designated participant may receive one or more automated and interactive voice messages providing information regarding the teleconference. Depending upon vocal or digital entries made by a designated participant using a phone or similar device, additional automated and interactive voice messages may be provided to the designated participant.

The invention may also integrate a designated participant location presence feature. In this feature, a designated participant may be automatically located by some form of location tracking mechanism, such as a global positioning system or a presence determination system that determines a user's presence based on status and/or use of a user's networked communications devices such as personal computer or telephone. Once a designated participant's location is determined, then the automatic caller automatically checks the designated participant's profile to determine how the participant should be called. This determination may include automatically altering the priority order of the designated participant's phone number numbers included in their profile based on the designated participant's location. This determination may also include making a decision to call or not call a designated participant depending on instructions provided in the designated participant's profile regarding their determined location. Additionally, a designated participant's location may be determined by the designated participant informing the automatic caller of their location.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, teleconferencing in the present disclosure includes many forms including using telephone land lines, cell phones, internet conferencing, videoconferencing and voice over internet protocol. Thus, alternate communication addresses other than phone numbers may be used in the teleconferencing system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A teleconference system for coordinating a prearranged teleconference involving a plurality of teleconference participants over at least one communications network, comprising:
  a memory that stores established parameters for contacting each of the plurality of teleconference participants; and
  a caller that systematically hunts and automatically calls out to designated teleconference participants that have been designated to participate in the teleconference over the at least one communications network based on the established parameters,
  wherein the established parameters include a phone number prioritization listing indicating the priority order of phone numbers associated with each of the plurality of teleconference participants such that the caller follows the phone number prioritization listing and automatically calls each designated teleconference participant using a highest priority phone number first, and
  wherein the established parameters include a do not use flag associated with each of the plurality of teleconference participant's phone numbers in the prioritization listing that can be selectably set by a teleconference participant to designate which of the teleconference participant's phone numbers are to be omitted from the prioritization listing.

2. A teleconference system as described in claim 1,
  wherein the caller automatically calls out to the designated teleconference participants at a preset time, and
  wherein the caller automatically includes all designated teleconference participants who answer the automatic call in the teleconference.

3. A teleconference system as described in claim 1,
  wherein the established parameters include a profile for each of the plurality of teleconference participants, the profile including each teleconference participant's name associated with one or more phone numbers where they may be contacted.

4. A teleconference system as described in claim 3,
  wherein the teleconference system includes a user application by which each of the plurality of teleconference participants may edit or update their profile.

5. A teleconference system as described in claim 3,
  wherein the profile further includes at least one or more additional unique identifiers, the unique identifiers comprising at least one of an employee number, an alphanumeric descriptor, and other identifiers.

6. A teleconference system as described in claim 1,
wherein, when the designated teleconference participant does not answer the first automatic call, the caller calls the next highest priority phone number, and
wherein the caller continues to follow the prioritization listing until the designated teleconference participant answers, or all of the phone numbers associated with the designated teleconference participant have been called.

7. A teleconference system as described in claim 6,
wherein the do not use flag can be set for specific days when a teleconference participant's phone number would be temporarily omitted from the prioritization listing.

8. A teleconference system as described in claim 7,
wherein the do not use flag includes attribute settings that can be set for each of the teleconference participant's phone numbers, the attribute settings including specified times for each day when a phone number would be temporarily omitted from the prioritization listing.

9. A teleconference system as described in claim 8,
wherein the attribute settings for each of the teleconference participant's phone numbers include specifying the times for each day when each phone number would be included in the prioritization listing, which when set for a particular day the remaining times for that particular day would be temporarily omitted from the prioritization listing.

10. A teleconference system as described in claim 9,
wherein the attribute settings for each of the teleconference participant's phone numbers include settings that may be customized according to considerations associated with each teleconference participant.

11. A teleconference system as described in claim 1,
wherein the plurality of teleconference participants are each provided with a designated personal access code; and
wherein each automatically called teleconferencing participant is connected to the teleconference upon entering the designated personal access code.

12. A teleconference system as described in claim 1,
wherein, if the teleconference participant has been designated to participant in more than one teleconference at a particular time, the caller only makes one automatic call.

13. A teleconference system as described in claim 12,
wherein, when the teleconference participant selects the particular teleconference in which the teleconference participant will participate, the remaining teleconferences in which the teleconference participant was designated to participate that conflict with the selected particular teleconference are automatically non-selected and the caller stops making any further automatic calls to the teleconference participant for the non-selected remaining teleconferences.

14. A teleconference system as described in claim 1,
wherein, after the teleconference participant has entered a designated personal access code, the teleconference participant is provided with a listing of teleconferences if the teleconference participant has been designated to participate in more than one teleconference, and
wherein the teleconference participant then selects the particular teleconference in which the teleconference participant will participate.

15. A teleconference system as described in claim 1,
wherein the caller does not call out to a designated teleconference participant who has already called in and joined the teleconference.

16. A method for coordinating a prearranged teleconference involving a plurality of teleconference participants over at least one communications network, comprising:
storing established parameters for contacting each of the plurality of teleconference participants in a memory; and
systematically hunting and automatically calling out to designated teleconference participants that have been designated to participate in a teleconference over the at least one communications network based on the established parameters,
wherein the established parameters include a phone number prioritization listing indicating the priority order of phone numbers associated with each of the plurality of teleconference participants such that the caller follows the phone number prioritization listing and automatically calls each designated teleconference participant using a highest priority phone number first, and
wherein the established parameters include a do not use flag associated with each of the plurality of teleconference participant's phone numbers in the prioritization listing that can be selectably set by a teleconference participant to designate which of the teleconference participant's phone numbers are to be omitted from the prioritization listing.

17. A non-transitory computer readable medium for storing a computer program that coordinates a prearranged teleconference involving a plurality of teleconference participants over at least one communications network, comprising:
a storing code segment, recorded on the medium, that stores established parameters for contacting each of the plurality of teleconference participants in a memory; and
an automatic caller segment, recorded on the medium, that systematically hunts and automatically calls out to designated teleconference participants that have been designated to participate in a teleconference over the at least one communications network based on the established parameters,
wherein the established parameters include a phone number prioritization listing indicating the priority order of phone numbers associated with each of the plurality of teleconference participants such that the caller follows the phone number prioritization listing and automatically calls each designated teleconference participant using a highest priority phone number first, and
wherein the established parameters include a do not use flag associated with each of the plurality of teleconference participant's phone numbers in the prioritization listing that can be selectably set by a teleconference participant to designate which of the teleconference participant's phone numbers are to be omitted from the prioritization listing.

18. A method for coordinating a prearranged teleconference as described in claim 16,
wherein the established parameters include a profile for each of the plurality of teleconference participants, the profile including each teleconference participant's name associated with one or more phone numbers where they may be contacted.

19. A method for coordinating a prearranged teleconference as described in claim 16,
wherein, when the designated teleconference participant does not answer the first automatic call, the caller calls the next highest priority phone number, and
wherein the caller continues to follow the prioritization listing until the designated teleconference participant answers, or all of the phone numbers associated with the designated teleconference participant have been called.

* * * * *